Figure 4:
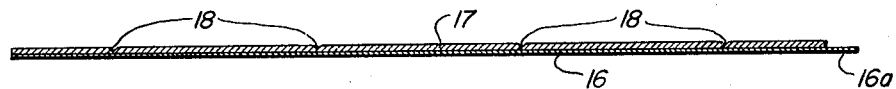

Sept. 27, 1960  R. S. SHELLY  2,954,054
REINFORCED MULTI-TUBE STRUCTURE
Filed Feb. 25, 1957  2 Sheets-Sheet 1
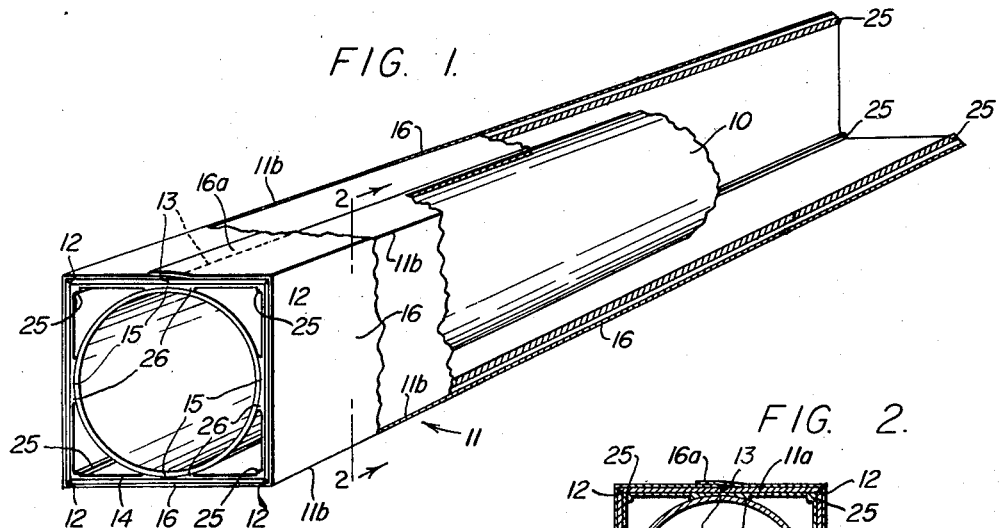
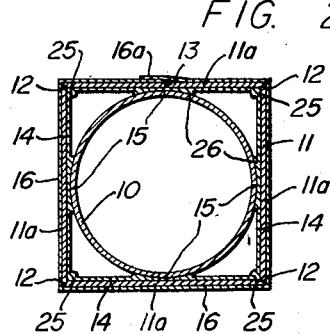
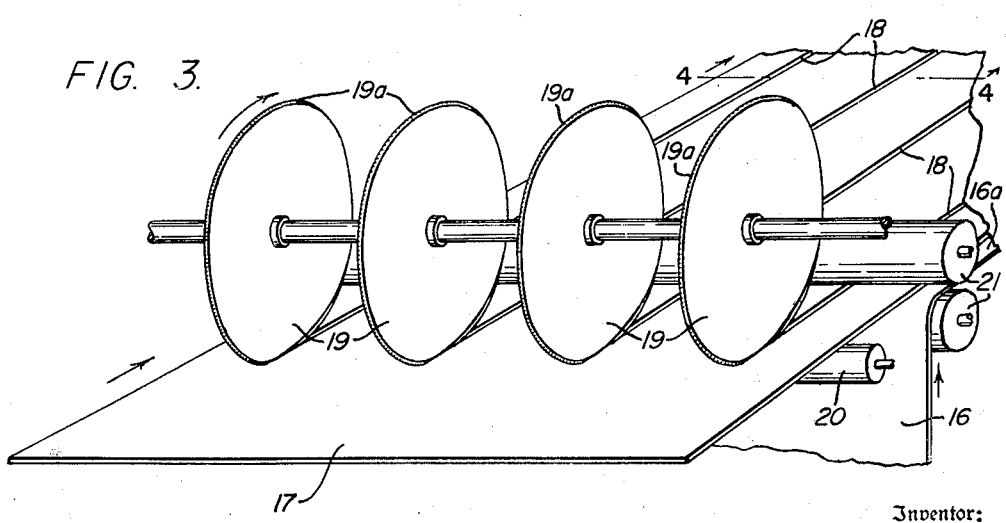
Inventor:
ROBERT S. SHELLY,
By
Attorneys.

Sept. 27, 1960    R. S. SHELLY    2,954,054
REINFORCED MULTI-TUBE STRUCTURE
Filed Feb. 25, 1957    2 Sheets-Sheet 2

Inventor:
ROBERT S. SHELLY,
By
Attorneys.

United States Patent Office 2,954,054
Patented Sept. 27, 1960

2,954,054
REINFORCED MULTI-TUBE STRUCTURE

Robert S. Shelly, Logan, Utah, assignor to Pack Manufacturing Company, Logan, Utah, a corporation of Utah Filed Feb. 25, 1957, Ser. No. 641,995

2 Claims. (Cl. 138—74)

This invention relates to structures made of paperboard, and particularly to multi-tube structures useful, for example, in the fabrication of containers.

In my copending application for U.S. Patent Serial Number 582,803, filed May 4, 1956, now Patent No. 2,872,265, issued February 3, 1959 entitled "Multiple Unit Storage File," I have disclosed a multiple compartment storage file cabinet made up of interlocked, individual, storage receptacle units, each having an elongate, duplex, tubular, body structure made of paperboard material and being cylindrical on the inside and rectangularly walled on the outside.

The present invention is concerned with providing an exceptionally strong and rigid structure of this type in an expeditious and economical manner.

A feature of the invention is the use of glue or similar hard-setting adhesive as a structural reinforcing and stiffening agent and as an adhesive in the joining of the paperboard tubes making up the multi-tube body structure.

Further objects and features of the invention will become apparent from the following detailed description of the preferred specific embodiment illustrated by way of example in the accompanying drawings.

Figure 5:
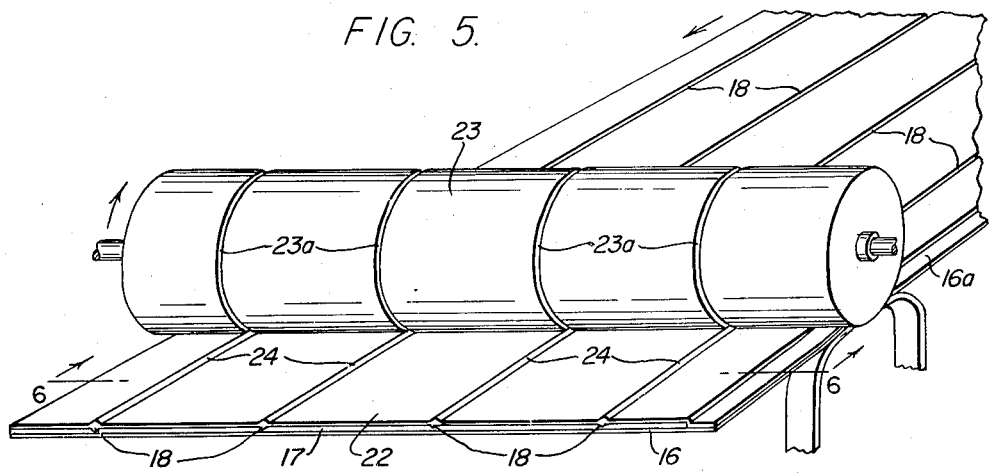
Figure 6:
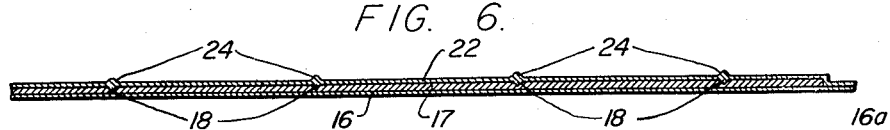
Figure 7:
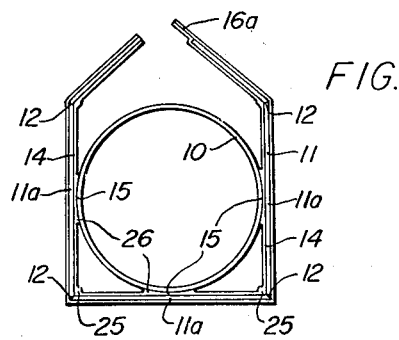

In the drawings:

Fig. 1 represents a perspective view of an elongate, duplex, tubular, body structure of paperboard material, such as is employed for the storage receptacle units of my aforementioned copending application, now Patent No. 2,872,265, portions being broken away to reveal internal details;

Fig. 2, a transverse vertical section taken on the line 2—2 of Fig. 1;

Fig. 3, a perspective view of schematic character showing a first processing stage in the preparation of the outer tube for the structure of Fig. 1;

Fig. 4, a transverse vertical section taken on the line 4—4 of Fig. 3, showing the processed sheet of paperboard of Fig. 3;

Fig. 5, a perspective view of schematic character showing the processed sheet of Fig. 4 being coated with glue as a second stage in the preparation of the outer tube for the structure of Fig. 1;

Fig. 6, a view similar to that of Fig. 4, but taken on the line 6—6 of Fig. 5; and Fig. 7, an end elevation of the inner and outer tube components as assembled at an advanced stage of the fabrication of the structure of Figs. 1 and 2.

Referring to the drawings:

The duplex, tubular, body structure of Figs. 1 and 2 is representative of multi-tube structures of the invention. It comprises, in this instance, a cylindrical inner tube 10 and an elongate outer tube 11 of right parallelepiped configuration which is square in cross section. Both tubes are rigidly made of paperboard material.

The inner tube 10 may be of conventional, spirally wound type, or may be otherwise fabricated to have suitable rigidity protective of contents, as with the usual mailing tubes. If spirally wound, the adhesive used in its fabrication should be moisture resistant to withstand, without distortion, the further processing required herein.

The outer tube 11 is preferably a single sheet of paperboard material folded along suitable miter groove fold lines 12 to provide elongate rectangular panel sections 11a between miter corners 11b, the lateral edges of the sheet meeting in mutually abutting relationship along a junction line 13.

The outer tube 11 contiguously encloses the inner tube 10, so that its panel sections 11a are tangent to such inner tube and so that the junction line 13 extends along the line of tangency of its panel section.

A coating 14 of a rigid-set adhesive, such as ordinary glue, covers the inner wall area of the outer tube 11, strengthening and stiffening the panel sections 11a and rigidly bonding such outer tube to the inner tube 10 at and along the tangents 15. Such adhesive extends into the corners 11b at the fold or miter junction lines 12 and between the material faces defining the miter grooves which establish such fold lines, thereby bonding such material faces together and stiffening and strengthening such corners.

An outer lamination 16 of relatively thin but strong sheet material, such as kraft paper or some other sheet material which may have decorative characteristics as well as strength, is adhesively secured to and about the outer peripheral area of the outer tube 11, desirably overlapping, as at 16a, along the junction line 13.

In accordance with the method of the invention, an elongate, rectangular, flat sheet 17, Fig. 3, of paperboard material has one of its faces grooved by cutting therein a series of mutually spaced and parallel, V-shaped or miter grooves 18 extending longitudinally of the sheet from end to end thereof, see particularly Figs. 4 and 5. This is advantageously accomplished by passing the sheet 17 under a gang cutter made up of a side-by-side series of mutually spaced circular saw blades 19 having tapered cutting edges 19a, the direction of feed relative to the direction of rotation of the blades being as indicated by the appended arrows.

The grooves 18 constitute fold lines on which the sheet 17 is folded, inwardly of such grooved face, to provide the outer tube 11.

Because the grooves 18 are preferably very deep relative to the thickness of the sheet 17 and, in fact, extend almost completely through such sheet, it is desirable that the outer lamination 16 be applied to the opposite face of the grooved sheet almost concurrently with the cutting of the grooves. Thus, as illustrated in Fig. 3, the underface of sheet 17 is coated with a thin layer of adhesive (not indicated), such as glue, by a roller 20 as the sheet is passed under the gang cutter, and a sheet of the laminating material 16 is fed to and applied over the so adhesively coated underface of the sheet 17, as by means of a pair of pressure rollers 21, it being noted that the lamination sheet 16 is somewhat wider than the base sheet 17 to provide the overlap 16a.

Such lamination 16 adds structural reinforcement to the entire outer tube 11, and of particular importance, provides hinging reinforcement and backing along the grooved fold lines 18.

Prior to folding the grooved and laminated sheet 17, a rigid-setting adhesive 22, Fig. 5, is applied over the entire area of the grooved face of the sheet, preferably by passing such grooved face under a glue-applying roller 23, as indicated in Fig. 5. If desired, such roller 23 may be mounted directly behind the set of rollers 21 in the arrangement of Fig. 3, so that all operations can be effected by a single pass of the base sheet 17 through the mechanism concerned.

The glue-applying roller 23 is preferably provided with circumferential grooves 23a corresponding in placement and spacing with the placement and spacing of the grooves 18, whereby a greater quantity of adhesive is applied over and along such grooves 18 on base sheet 17, see 24, Fig. 5, than upon the panel sections therebetween to form the strengthening and stiffening coating 13 of Figs. 1 and 2.

Following application of the adhesive 22 to the grooved and laminated sheet 17, the latter is applied to and folded about the inner tube 10, as indicated in Fig. 7, on and along the grooves 18 as fold lines and inwardly of the grooved and adhesively coated face of the sheet, so that the panel sections 11a are tangentially contiguous and adherent, respectively, to the inner tube 10.

The so-folded sheet 17 is held in the completely folded condition of Figs. 1 and 2 in any suitable manner until the adhesive 22 sets sufficiently to maintain the adherence along the areas of tangency 15.

It will be noted that the folding of the sheet 17 causes the adhesive 22 within the grooves 18 to exude inwardly of the folded sheet at the corners of the resulting outer tube 11, where it joins the deposited excess 24 to form thereat inwardly projecting columns 25 of adhesive which extend along the inside of the corners 11b and set integrally with the coating 13. Thus, such columns 25 structurally reinforce the corners 11b of the outer tube 11, providing strength and rigidity additional to that provided by the bonding of the groove-defining faces of the paperboard material of base sheet 17 within and along the miter groove lines 12.

There is also a tendency for the adhesive 22 to exude laterally of the tangential areas 15 and provide structural reinforcements 26 thereat and therealong, see Figs. 1 and 2.

Whereas this invention is here illustrated and described with respect to a specific embodiment thereof, it should be realized that changes may be made within the scope of the following claims, without departing from the essential contributions to the art made by the teachings hereof.

I claim:

1. A multi-tube structure of paperboard material, comprising a rigid inner tube of paperboard material whose cross section is of closed-curve configuration; a rigid outer tube formed from a sheet of paperboard material folded about and enclosing said inner tube as a sleeve therefor, said outer tube being polygonal in cross section and having elongate rectangular walls which tangentially contact said inner tube, one of said walls being formed by mutually opposite marginal portions of said sheet disposed in edge-to-edge contiguity along the line of tangency of that wall with said inner tube; and a rigid-set adhesive superficially covering substantially the entire inner wall area of said outer tube in the form of an unbroken, rigid sheet substantially coextensively adherent to said inner wall area, strengthening and stiffening said outer tube throughout and rigidly bonding it to said inner tube at and along the tangential contacts therebetween.

2. The multi-tube structure of claim 1, wherein the sheet of paperboard material making up the outer tube has miter corners resulting from V-grooves cut into the inside face thereof, and an outer lamination sheet of relatively thin hinging material is adhesively secured to and upon the outer face of said sheet of paperboard material, backing and reinforcing said miter corners, mutually opposite margins of said lamination sheet overlapping and being adhesively secured together at and along the contiguous edges of the said sheet of paperboard material as a protective and strengthening cover therefor.

References Cited in the file of this patent

UNITED STATES PATENTS

| | | |
|---|---|---|
| 1,633,229 | Rosenthal | June 21, 1927 |
| 1,959,426 | Henderson | May 22, 1934 |
| 2,076,210 | Stadtfeld | Apr. 6, 1937 |
| 2,261,621 | Harrison | Nov. 4, 1941 |
| 2,382,573 | Moore | Apr. 14, 1945 |
| 2,634,759 | Twickler | Apr. 14, 1953 |
| 2,671,384 | D'Ambrosio | Mar. 9, 1954 |
| 2,676,745 | Geisler | Apr. 27, 1954 |
| 2,691,499 | Watts | Oct. 12, 1954 |
| 2,714,395 | Epstein | Aug. 2, 1955 |
| 2,754,044 | Bergstein | July 10, 1956 |
| 2,783,692 | Balding | Mar. 5, 1957 |
| 2,829,700 | Stahl et al. | Apr. 8, 1958 |